(12) United States Patent
Patel et al.

(10) Patent No.: US 9,071,101 B2
(45) Date of Patent: Jun. 30, 2015

(54) HIGH ALTITUDE, HIGH VOLTAGE REAR TERMINAL BLOCK ASSEMBLY

(75) Inventors: Dhaval Patel, Loves Park, IL (US); Edward C. Allen, Davis, IL (US); Alan D. Hanson, Winnebago, IL (US); Laurence D. Vanek, Janesville, WI (US); Glenn C. Lemmers, Jr., Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 597 days.

(21) Appl. No.: 13/396,996

(22) Filed: Feb. 15, 2012

(65) Prior Publication Data

US 2013/0207494 A1 Aug. 15, 2013

(51) Int. Cl.
*H02K 11/00* (2006.01)
*F02C 7/32* (2006.01)
*H02K 5/22* (2006.01)

(52) U.S. Cl.
CPC *H02K 5/225* (2013.01); *F02C 7/32* (2013.01); *F05D 2220/76* (2013.01); *Y02T 50/672* (2013.01); *Y10T 29/49009* (2015.01)

(58) Field of Classification Search
USPC .................................. 310/71; 439/709, 892
See application file for complete search history.

(56) References Cited

U.S. PATENT DOCUMENTS

| 4,380,039 | A | 4/1983 | King |
|---|---|---|---|
| 4,835,650 | A | 5/1989 | Epstein |
| 5,169,338 | A | 12/1992 | Dewar et al. |
| 5,413,500 | A | 5/1995 | Tanaka |
| 5,791,936 | A | 8/1998 | Nicholson |
| 5,991,138 | A | 11/1999 | Sklar et al. |
| 6,291,878 | B1 | 9/2001 | Anderson et al. |
| 6,576,838 | B2 | 6/2003 | Matsumura |
| 6,897,584 | B2 | 5/2005 | Doherty et al. |
| 7,236,343 | B2 | 6/2007 | Heidlebaugh et al. |
| 7,310,573 | B2 | 12/2007 | Stickling |
| 7,472,547 | B2 | 1/2009 | Grosskopf et al. |
| 7,857,669 | B1 | 12/2010 | Wavering |
| 8,197,288 | B1* | 6/2012 | Patel et al. ............... 439/709 |
| 2002/0042231 | A1* | 4/2002 | Brooks et al. ............ 439/709 |
| 2003/0148667 | A1* | 8/2003 | Lias et al. ................ 439/709 |
| 2004/0092134 | A1 | 5/2004 | Morikaku et al. |

(Continued)

FOREIGN PATENT DOCUMENTS

CN 101924416 A 12/2010

OTHER PUBLICATIONS

U.S. Appl. No. 12/872,072, filed Aug. 31, 2010, "Terminal Block Cover with Nut Retention Feature".

(Continued)

*Primary Examiner* — Naishadh Desai
(74) *Attorney, Agent, or Firm* — Carlson, Gaskey & Olds, P.C.

(57) ABSTRACT

A disclosed terminal block assembly for a generator includes a terminal block with a base with first and second transverse terminal surfaces adjoining one another. One of the terminal surfaces includes an increased width greater than a length of a cable terminal lug for providing a lightning strike and creepage barrier. The terminal surfaces include spaced apart protrusions extending from the first and second surfaces to provide spaced apart terminal areas overlapping the first and second surfaces. First and second terminal studs are disposed within each corresponding first and second terminal areas and are electrically connected by a bus bar.

15 Claims, 5 Drawing Sheets

(56) References Cited

U.S. PATENT DOCUMENTS

| | | | | |
|---|---|---|---|---|
| 2005/0218732 | A1* | 10/2005 | Boyland et al. | 310/71 |
| 2006/0105637 | A1* | 5/2006 | Chiang | 439/709 |
| 2007/0222329 | A1 | 9/2007 | Bin | |
| 2008/0218012 | A1* | 9/2008 | Rogner et al. | 310/71 |
| 2009/0130868 | A1 | 5/2009 | Schenk et al. | |
| 2011/0130049 | A1* | 6/2011 | Kaneshiro | 439/709 |

OTHER PUBLICATIONS

Prior Art—Figure A—VFSG Terminal Blocks.

Prior Art—Figure B—VFSG Rear Terminal Block.

Prior Art—Figure C—VFSG Rear Terminal Block with Jumpers Removed Showing Bus Bars.

* cited by examiner

HIGH ALTITUDE, HIGH VOLTAGE REAR TERMINAL BLOCK ASSEMBLY

BACKGROUND

This disclosure relates to a terminal block assembly, and more particularly, to a rear terminal block assembly for use on a gas turbine engine generator.

In gas turbine engine generator applications, a terminal block assembly provides a connection between the phase leads and the generator stator. The terminal block assembly is used to protect the phase terminals from arcing from the terminal leads and adjacent conducting surfaces. The terminal block assembly is also used to protect the phase terminals from foreign object debris that could cause electrical shorting. In some applications, a rear terminal block assembly is also used to provide a more accessible location to make electrical connections than the terminal block assembly connected to the stator.

Additionally, the terminal block assemblies must maintain operating electrical integrity during lightning strikes, which may occur at high altitude. Thus, the terminal block assemblies must withstand significant voltages at high altitude conditions.

SUMMARY

An example disclosed terminal block assembly for a generator includes a terminal block with a base with first and second transverse terminal surfaces adjoining one another. One of the terminal surfaces includes an increased width greater than a length of a cable terminal lug for providing a lightening strike barrier. The terminal surfaces include spaced apart protrusions extending from the first and second surfaces to provide spaced apart terminal areas overlapping the first and second surfaces. First and second terminal studs are disposed within each corresponding first and second terminal areas and are electrical connected by a bus bar.

These and other features disclosed herein can be best understood from the following specification and drawings, the following of which is a brief description.

DETAILED DESCRIPTION

Figure 1:
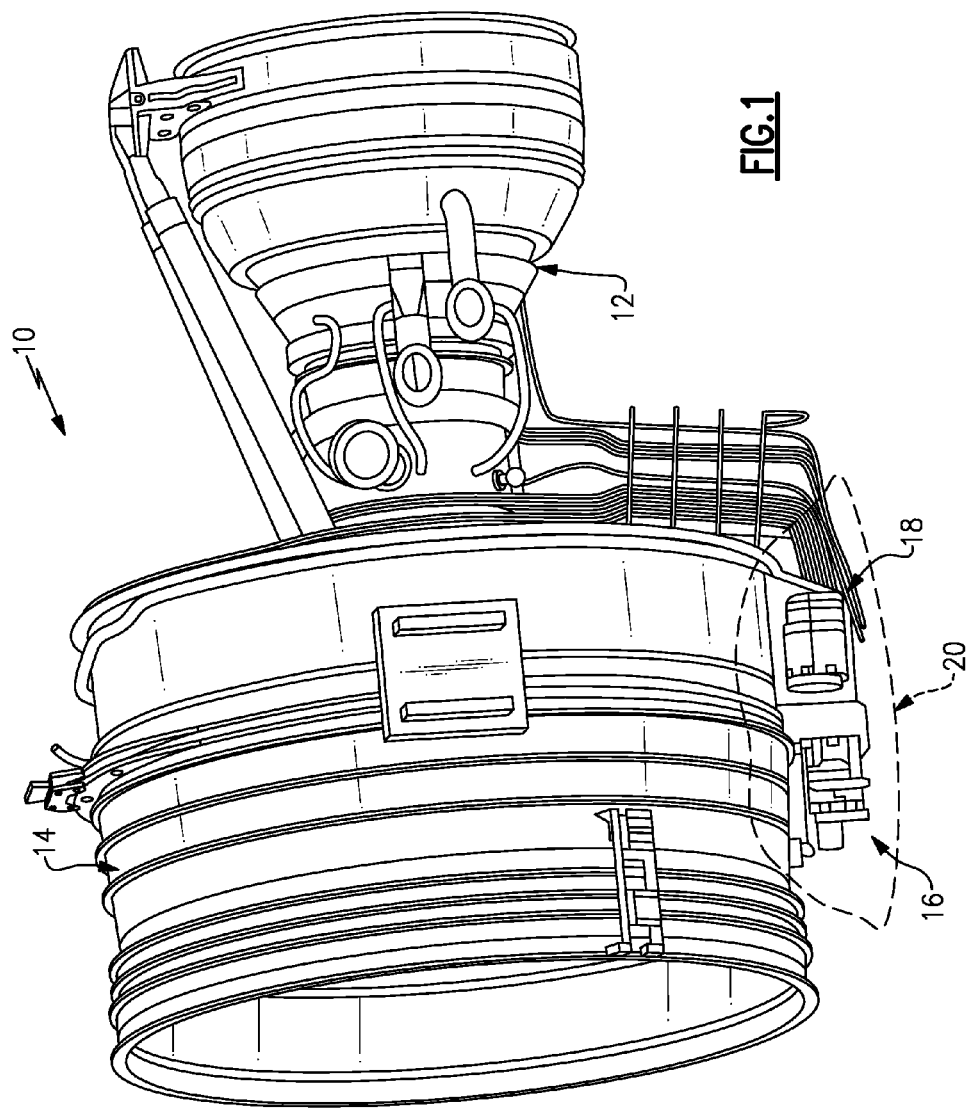
FIG. 1 is a perspective view of an example gas turbine engine.

An example gas turbine engine 10 is illustrated in FIG. 1. The gas turbine engine 10 includes a core 12 supported relative to a fan case 14 in a high bypass configuration. One or more generators 16, 18 are supported on the engine 10. The fan case 14 and generators 16, 18 are covered by a fan nacelle 20. The fan nacelle 20 can obstruct maintenance workers from access to the generators 16, 18. In such instances, it may be desirable to configure the interface where the aircraft power feeders connect to the generator terminal block for improved access.

Figure 2:
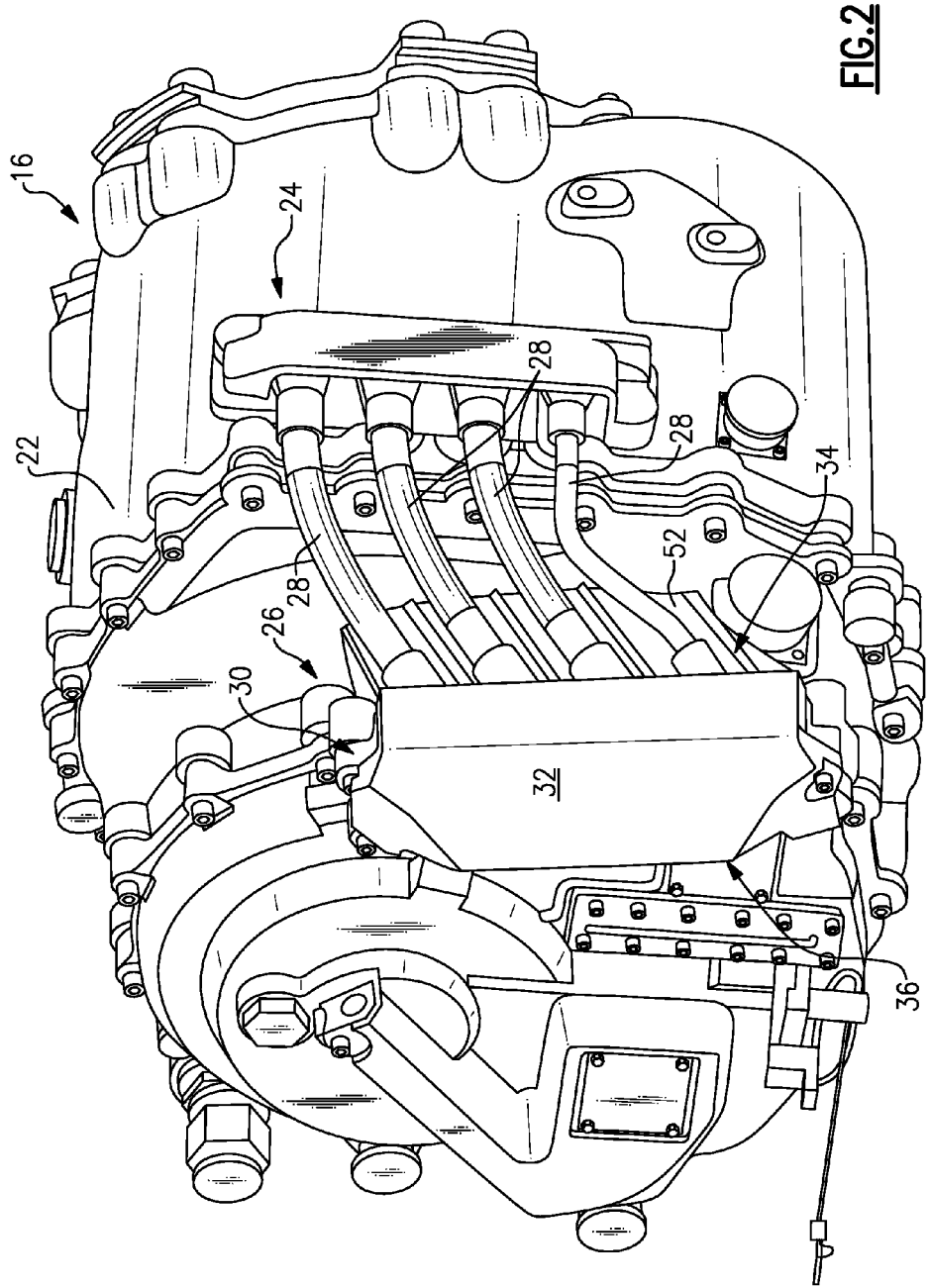
FIG. 2 is a side perspective view of an example generator having a first and second terminal block assemblies electrically connected to one another by cables.

Referring to FIG. 2, one arrangement is illustrated that provides maintenance workers with easier access to the terminal block of the generator 16. A first terminal block assembly 24 provides the exterior electrical connection to the interiorly located stator within the housing 22 of the generator 16. Cables 28 electrically connect the first terminal block assembly 24 to a second terminal block assembly 26 that is positioned in a location more easily accessible by a maintenance workers. The second terminal block assembly 26 includes a terminal block 30 mounted to the housing 22. A cover 32 is secured relative to the terminal block 30 over the cables 28, which extend from a first opening 34 provided by the cover 32. A second opening 36 provided by the cover 32 provides for connection of other cables not shown here.

Figure 3:
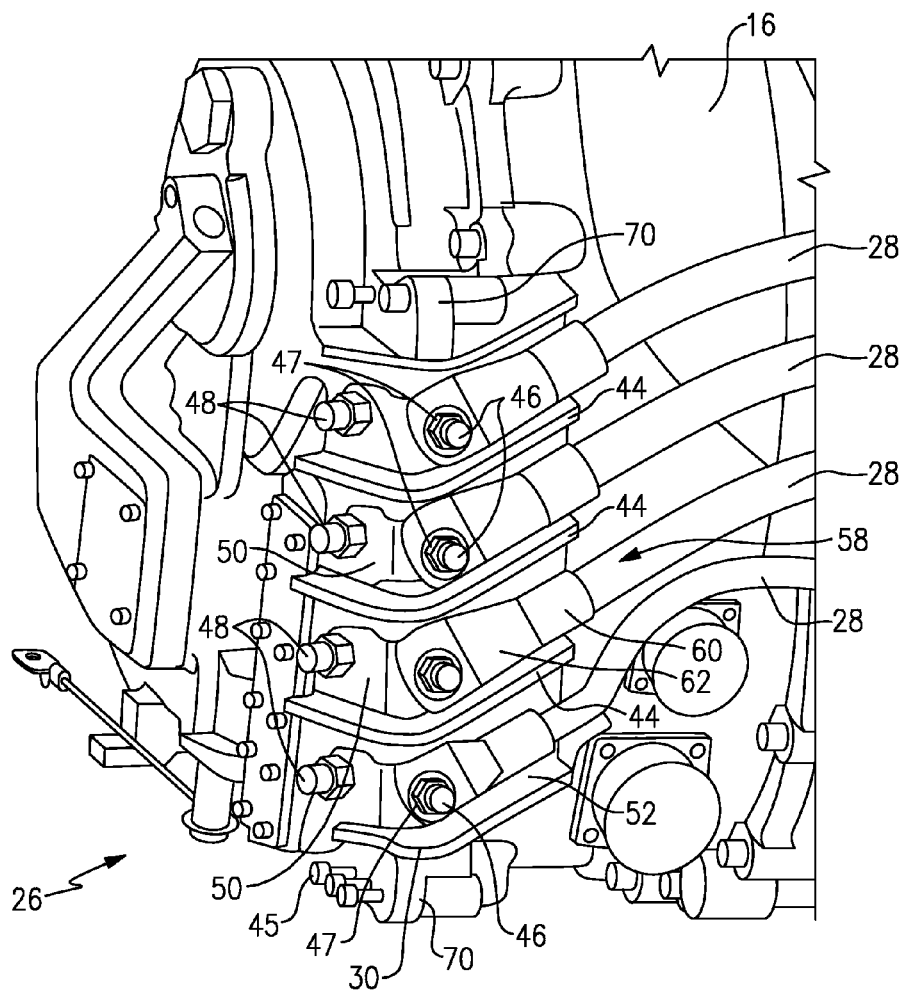
FIG. 3 is a side view of the second terminal block assembly without a cover.
Figure 4:
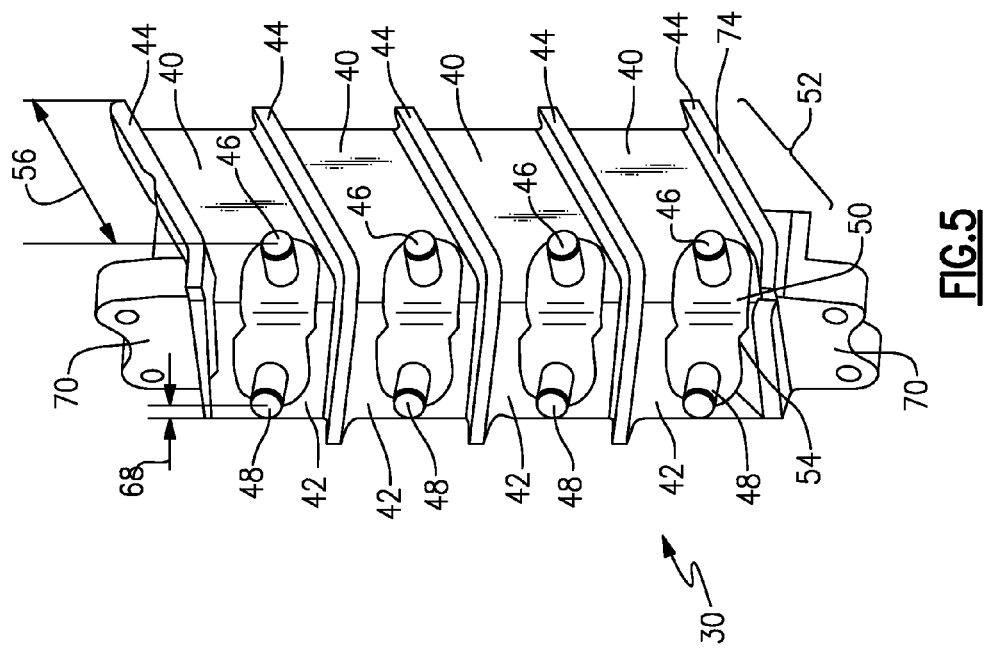
FIG. 4 is a side view of the second terminal block assembly without the cover and cables.

Referring to FIGS. 3 and 4, the terminal block 30 includes first and second adjoining terminal surfaces 40, 42 that are transversely arranged relative to one another. The first and second surfaces 40, 42 are arranged at an angle relative to one another. Protrusions or ribs 44 extend from and overlap the first and second surfaces 40, 42 on a topside 74 of the block 30 and are spaced apart from one another to provide terminal areas at which the cables 28 are connected. A first terminal stud 46 is provided at each of the first terminal surfaces 40. A second terminal stud 48 extends from the second terminal surface 42. The terminal studs 46, 48 are separated and shielded from the housing 22 by the block 30. The block 30 is fabricated from an insulating material such as a composite plastic material having sufficient structural durability to operate in the environment of the aircraft engine.

The insulating material provided by the block 30 prevents an electrical ground between the terminal cables 28, first and second terminal studs 46, 48 and the housing 22. Fasteners 45 secure the block 30 to the housing 22. Nuts 47 are threadingly received onto the terminal studs 46, 48 to secure the cables 28 to the block 30, as illustrated in FIG. 4. A bus bar 50 extends between the first terminal stud 46 and the second terminal stud 48 to provide an electrical connection. The bus bars 50 included rounded edges and are configured to bend around the transverse interface between the first and second terminal surfaces 40, 42. A recess 54 is defined between each set of first and second terminal studs 46, 48 within which the bus bar 50 is received. The bus bar 50 is thereby even with or below the first and second terminal surfaces 46, 48.

Figure 6:
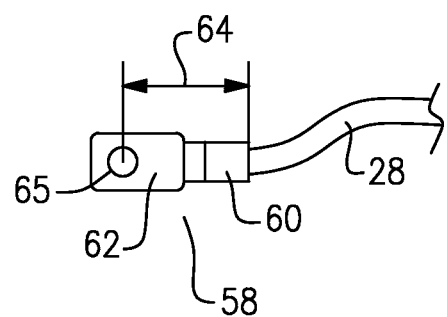
FIG. 6 is a schematic view of a part of an example cable.

Referring to FIG. 3 and FIG. 6, each of the cables 28 includes a lug 58 having a barrel 60 and a flange 62 extending from the barrel 60. The flange 62 defines an opening 65 for receiving a terminal stud 46. Nuts 47 are received on each terminal stud 46, 48 to secure the corresponding terminal lug 58.

Figure 5:
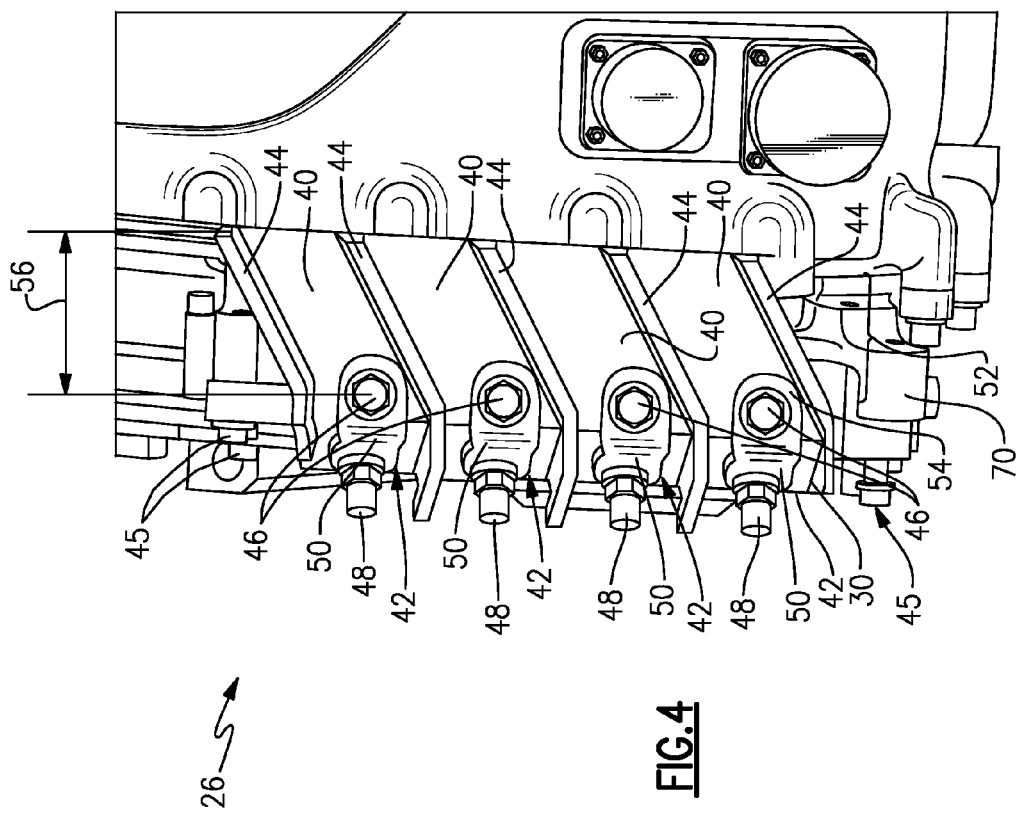
FIG. 5 is a perspective view of a front side of the second terminal block assembly.

Referring to FIGS. 4 and 5 with continued reference to FIG. 6, the block 30 includes a shelf 52 that extends outwardly from the first terminals 46 a first width 56. The first width 56 provides a first terminal area 40 that is larger than that of the second terminal area 42. The first terminal area overlaps a portion of the generator 16 that is closer to the housing 22 that cables than would extend in close proximity to the housing 22. The shelf 52 shields the lugs 58 and cables 28 from the housing such that extreme electrical events such as during a lightening strike; electrical energy is prevented from direct arcing between the housing 22 and the cables 28 and/or lugs 58. In addition to preventing a direct arc, the shelf 52 sizing provides protection against an arc that follows a creepage path between the housing 22 and the cables 28 and/or lugs 58. The shelf 52 provides protection against a creepage path by increasing the distance that debris can deposit to form a conductive bridge.

The example shelf 52 includes a first width 56 measured from the first terminal stud 46 to an end portion of the shelf. A second width 68 measured from the second terminal stud 48 to an end of the second terminal area 42 is less than the first width 56. The first width 56 is greater than a length 64 measured from the opening 65 of the lug to the end of the barrel 60. The increased width 56 shields the lug 58 and a portion of the cable from the housing 22 to prevent any undesired cross conduction. The first terminal areas 40 are angled relative to the second terminal areas 42 to provide for application specific routing and guiding of the cables 28. Moreover, the ribs 44 provide a separation function to prevent undesired contact or conduction between cables.

Figure 7:
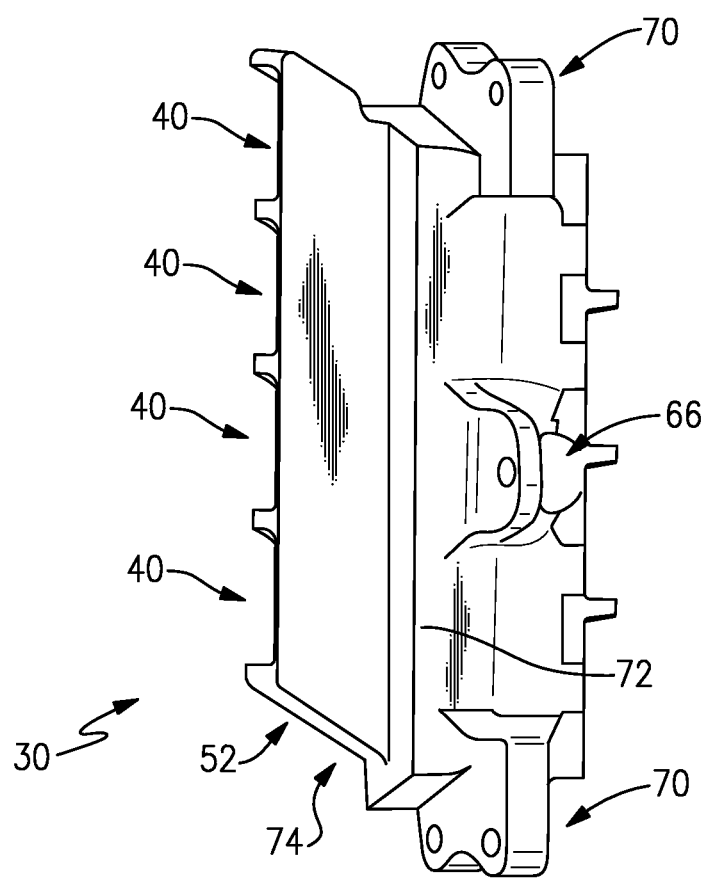
FIG. 7 is a perspective view of a backside of the second terminal block assembly.

Referring to FIG. 7 with continued reference to FIG. 5, the block 30 includes a backside 72 that is faced toward the housing 22 when in an assembled condition. The block 30 includes mounting flanges 70 that include openings for fasteners 45. The fasteners secure the clock 30 to the housing and can be a path for electrical conduction in the event of a lightening strike. Accordingly, the flanges 70 extend away from the terminal lugs 58 to space the fasteners 45 apart from the electrical connection between the lugs 58 and the terminal studs 46, 48. A central mounting opening 66 disposed on the back side 72 is recessed to further space the fastener received therein apart from the electrically conductive surfaces of the second terminal assembly 26.

The example terminal block assembly 26 provides the desired ease of connection while also preventing undesired arcing during high electrical energy events such as lightening strikes.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A terminal block assembly for a generator comprising:
   a terminal block have a base including first and second transverse surfaces adjoining one another, and spaced apart protrusions extending from the first and second surfaces to provide spaced apart terminal areas overlapping the first and second surfaces;
   first and second terminal studs provided in corresponding first and second terminal areas, wherein at least one of the terminal areas includes a length measured from the corresponding one of the first and second terminal studs to an end of the terminal area greater than a length of a lug of a cable attachable to the corresponding one of the first and second terminal studs; and
   a bus bar extending from the first terminal stud to the second terminal stud providing electrical conduction between the first and second terminal studs.

2. The assembly as recited in claim 1, wherein a first width of the first terminal area measured from the first terminal stud to a first end is greater than a second width of the second terminal area measured from the second terminal stud to a second end of the second terminal area.

3. The assembly as recited in claim 2, wherein the first width is greater than a length of the lug of a cable attachable to the first terminal stud.

4. The assembly as recited in claim 1, wherein the base includes flange configured to receive fasteners for securing the terminal block to a component.

5. The assembly as recited in claim 1, comprising a cover configured to be secured over the terminal block and including first and second openings on opposing sides of the cover respectively configured to receive first and second sets of cables.

6. The assembly as recited in claim 5, wherein the cover includes a perimeter overlapping the cable and extending over the lug, wherein the first terminal area extends past the perimeter of the cover.

7. The assembly as recited in claim 1, wherein the lug includes a barrel and a flange interconnecting the barrel, the flange including a hole for receiving the terminal stud and a first width of the first terminal area is greater than a distance from the terminal lug to a distal end of the barrel.

8. The assembly as recited in claim 1, wherein an interface extending from the first terminal stud to the second terminal stud is recessed and the bus bar is received within the interface.

9. The assembly as recited in claim 1, including a centrally orientated mounting opening recessed a distance away from the second terminal surface.

10. A generator comprising:
    a generator housing;
    first and second terminal blocks secured to the housing remotely from one another;
    cables electrically connecting the first and second terminal blocks to one another; and
    wherein the second terminal block comprises a base and a cover, the base including first and second transverse surfaces adjoining one another, and spaced apart protrusions extending from the first and second surfaces to provide spaced apart terminal areas overlapping the first and second surfaces;
    first and second terminal studs provided in corresponding first and second terminal areas, wherein at least one of the terminal areas includes a length measured from the corresponding one of the first and second terminal studs to an end of the terminal area greater than a length of a lug of a cable attachable to the corresponding one of the first and second terminal studs; and
    a bus bar extending from the first terminal stud to the second terminal stud providing electrical conduction between the first and second terminal studs.

11. The generator according to claim 10, wherein the cables include a lug arranged in a terminal area between the base and the cover, the lug secured to the terminal stud with a nut.

12. The generator according to claim 10, wherein the lug includes a barrel and a flange having an opening for receiving the first terminal stud and the length of the first terminal area is greater than a distance from the first terminal stud to a distal end of the barrel when secured to the first terminal stud.

13. The generator as recited in claim 10, wherein a first width of the first terminal area measured from the first terminal stud to a first end is greater than a second width of the second terminal area measured from the second terminal stud to a second end of the second terminal area.

14. The generator as recited in claim 10, comprising a cover configured to be secured over the second terminal block and including first and second openings on opposing sides of the cover respectively configured to receive first and second sets of cables.

15. The generator as recited in claim 14, wherein the cover includes a perimeter overlapping the cable and extending over the lug, wherein the first terminal area extends past the perimeter of the cover.

* * * * *